(12) United States Patent
Morishita et al.

(10) Patent No.: US 10,646,776 B2
(45) Date of Patent: May 12, 2020

(54) SERVER APPARATUS, METHOD, AND NON-TRANSITORY COMPUTER-READABLE MEDIUM

(71) Applicant: GungHo Online Entertainment, Inc., Tokyo (JP)

(72) Inventors: Kazuki Morishita, Tokyo (JP); Daisuke Yamamoto, Tokyo (JP); Kenji Kobayashi, Tokyo (JP); Koichi Nobori, Tokyo (JP); Tomoyuki Morishita, Tokyo (JP); Hajime Miyajima, Tokyo (JP); Atsuo Kamiya, Tokyo (JP); Satoru Obana, Tokyo (JP)

(73) Assignee: GungHo Online Entertainment, Inc. (JP)

( * ) Notice: Subject to any disclaimer, the term of this patent is extended or adjusted under 35 U.S.C. 154(b) by 755 days.

(21) Appl. No.: 15/183,332

(22) Filed: Jun. 15, 2016

(65) Prior Publication Data

US 2017/0239565 A1    Aug. 24, 2017

Related U.S. Application Data

(63) Continuation of application No. PCT/JP2016/054670, filed on Feb. 18, 2016.

(51) Int. Cl.
*A63F 9/24* (2006.01)
*A63F 13/335* (2014.01)
(Continued)

(52) U.S. Cl.
CPC .......... *A63F 13/335* (2014.09); *A63F 13/216* (2014.09); *A63F 13/69* (2014.09); *G01S 19/13* (2013.01)

(58) Field of Classification Search
CPC ...... A63F 13/335; A63F 13/69; A63F 13/216; G01S 19/13; H04W 4/02
See application file for complete search history.

(56) References Cited

U.S. PATENT DOCUMENTS 4,643,421 A * 2/1987 Meyer ................... A63F 13/005
                                                    463/1
10,147,058 B1 * 12/2018 Ouimette ............... G06Q 10/06
(Continued)

FOREIGN PATENT DOCUMENTS

JP      2012-005652 A    1/2012
JP      2013-152686 A    8/2013
WO   WO-2010-119866 A1   10/2010

*Primary Examiner* — Dmitry Suhol
*Assistant Examiner* — Carl V Larsen
(74) *Attorney, Agent, or Firm* — Harness, Dickey & Pierce, P.L.C.

(57) ABSTRACT

A server apparatus, method, and program are provided that are capable of causing information about the real world to be reflected in the virtual world of a game. First, a server apparatus receives a signal including at least one of location information sent from a terminal apparatus or specific point-to-point distance information calculated based on the location information. Next, the server apparatus, based on at least one of the location information or the distance information, calculates a cumulative distance between a plurality of other points through which the terminal apparatus has passed in the real world. Next, the server apparatus sets a reward to be granted to the terminal apparatus in accordance with the cumulative distance. This makes it possible, for example, to cause an online game to be closely correlated with the daily life of the user, and to arouse the interest of users in the online game.

10 Claims, 19 Drawing Sheets

(51) Int. Cl.
*A63F 13/69* (2014.01)
*A63F 13/216* (2014.01)
*G01S 19/13* (2010.01)

(56) References Cited

U.S. PATENT DOCUMENTS

| | | | |
|---|---|---|---|
| 2012/0040692 A1* | 2/2012 | Baba | G01C 22/00 455/456.1 |
| 2013/0005437 A1* | 1/2013 | Bethke | G06Q 30/0209 463/25 |
| 2013/0165233 A1* | 6/2013 | Wada | A63F 13/85 463/42 |
| 2014/0295963 A1* | 10/2014 | Ishikawa | A63F 13/65 463/31 |
| 2014/0304076 A1* | 10/2014 | Baca | H04M 1/72572 705/14.58 |
| 2014/0306861 A1* | 10/2014 | Takahashi | A63F 13/428 345/1.2 |
| 2015/0024783 A1* | 1/2015 | Konno | A63F 13/30 455/456.3 |
| 2015/0170247 A1* | 6/2015 | Jones | H04W 4/60 705/26.62 |
| 2015/0335291 A1* | 11/2015 | Saadi | G01C 22/006 702/141 |

* cited by examiner

US 10,646,776 B2

SERVER APPARATUS, METHOD, AND NON-TRANSITORY COMPUTER-READABLE MEDIUM

This application is a continuation patent application of International Application No. PCT/JP2016/054670 filed on Feb. 18, 2016, entitled "SERVER APPARATUS, METHOD, AND PROGRAM", which is hereby expressly incorporated by reference herein in its entirety.

TECHNICAL FIELD

The present invention relates to an apparatus and a method. For example, the present invention relates to a server apparatus, a method, and a non-transitory computer-readable medium.

BACKGROUND

Online gaming has grown in line with the widespread use of the Internet. In the case of online gaming, information about a character operated by a user in the virtual world of a game can be changed in accordance with information about the user in the real world. For example, Japanese Laid-open Patent Application 2012-5652 discloses a game system that changes the attribute of a character operated by the user when the user is in a predetermined area of the real world at a predetermined time period.

SUMMARY

The purpose of one embodiment of the present invention is to provide a novel apparatus and method. For example, the purpose is to provide a novel server apparatus, method, and non-transitory computer-readable medium that enable information in the real world to be reflected in the virtual world of a game.

One embodiment according to the present invention is a server apparatus comprising: a communication unit for receiving a signal that includes at least one of location information sent from a terminal apparatus or specific point-to-point distance information calculated on the basis of the location information; an aggregation unit for calculating, on the basis of at least one of the location information or the distance information, a cumulative distance between a plurality of other points through which the terminal apparatus has passed in the real world; and a reward setting unit for causing a reward to be granted to the terminal apparatus to be set in accordance with the cumulative distance.

Another embodiment according to the present invention is a method comprising: the communication unit of the server apparatus receiving a signal that includes at least one of the location information sent from the terminal apparatus or the specific point-to-point distance information calculated on the basis of the location information; the aggregation unit of the server apparatus calculating, on the basis of at least one of the location information or the distance information, the cumulative distance between the plurality of other points through which the terminal apparatus has passed in the real world; and the reward setting unit of the server apparatus setting the reward that is to be granted to the terminal apparatus in accordance with the cumulative distance.

Another embodiment according to the present invention is a non-transitory computer-readable medium in which a computer program is stored, the computer program causing a computer for transmitting and receiving signals to and from the terminal apparatus to function as: the communication unit of the server apparatus for receiving the signal that includes at least one of the location information sent from the terminal apparatus or the specific point-to-point distance information calculated on the basis of the location information; the aggregation unit of the server apparatus for calculating, on the basis of at least one of the location information or the distance information, the cumulative distance between the plurality of other points through which the terminal apparatus has passed in the real world; and the reward setting unit of the server apparatus for setting the reward that is to be granted to the terminal apparatus in accordance with the cumulative distance.

According to the embodiment of the present invention, it is possible to provide a novel apparatus and method. For example, it is possible to provide a novel server apparatus, method, and non-transitory computer-readable medium that enable information in the real world to be reflected in the virtual world of a game.

DETAILED DESCRIPTION

Figure 1:
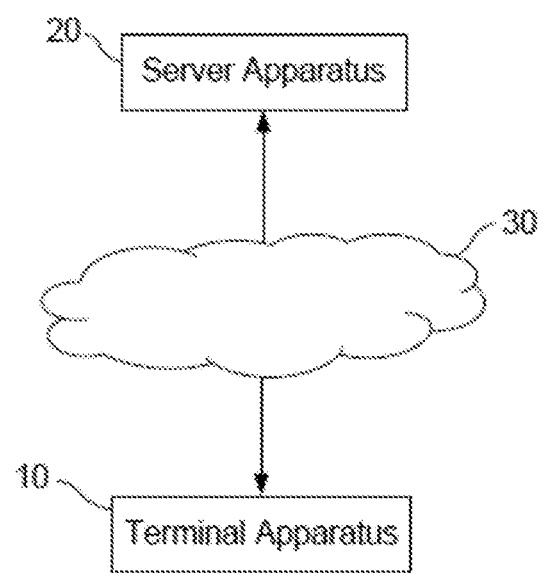
FIG. 1 is a diagram showing an example of a system.

Examples of the apparatus and method according to one embodiments of the present invention will be explained in detail by referring to the drawings.

1. System

FIG. 1 is a diagram showing a system according to one embodiment of the present invention. The system shown in FIG. 1 has a terminal apparatus 10, and a server apparatus 20 that is able to communicate with the terminal apparatus 10 over a network 30.

Various applications can be executed in the system shown in FIG. 1. Furthermore, in one embodiment according to the present invention, an application may be any of software that operates on an operating system (OS) of the server apparatus 20, software that the terminal apparatus 10 accesses over the network and which is installed in the terminal apparatus 10, and software that downloads new information from the server apparatus as needed in accordance with the execution of the software.

(1) Terminal Apparatus

Figure 2:
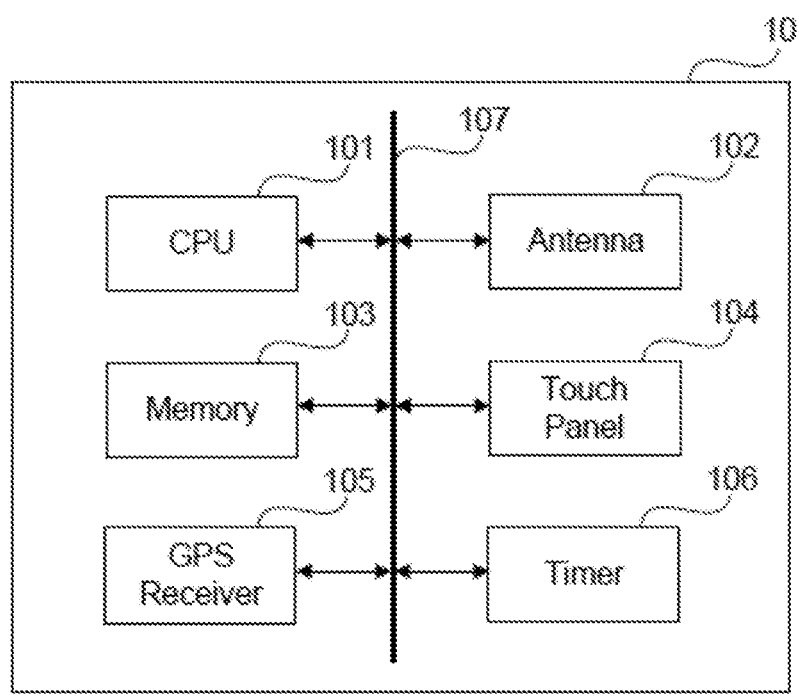
FIG. 2 is a diagram showing an example of the configuration of a terminal apparatus.

FIG. 2 is a diagram showing an example of the configuration of the terminal apparatus 10 shown in FIG. 1. The terminal apparatus 10 shown in FIG. 2 includes a central processing unit (CPU) 101, an antenna 102, a memory 103, a touch panel 104, a global positioning system (GPS) receiver 105, and a timer 106. The components are electrically connected to one another via a bus 107. The terminal apparatus according to one embodiment of the present invention is not limited solely to the configuration of the terminal apparatus 10 shown in FIG. 2. That is, a terminal apparatus to which components not shown in FIG. 2 have been added can be used as the terminal apparatus according to one embodiment of the present invention. Furthermore, the terminal apparatus according to one embodiment of the present invention is not limited to a terminal apparatus that is equipped with all of the plurality of components shown in FIG. 2. For example, a terminal apparatus that does not have the timer 106 can be used as the terminal apparatus according to one embodiment of the present invention.

The CPU 101 can execute a command included in software that is stored in the memory 103. Specifically, the CPU 101 is able to control the antenna 102 for sending a signal that includes various information from the server apparatus 20, control the touch panel 104 for presenting a user with specific information and arithmetic processing based on a touch panel 104 operation by the user, control the GPS receiver 105 for detecting a location, and control the timer 106 for measuring time. For example, the CPU 101 can control the antenna 102 so that a signal including specific information is sent to the server apparatus 20. The specific information may include location information showing the location of the terminal apparatus 10 at a specific time, and specific point-to-point distance information calculated on the basis of the location information.

The memory 103 is used to store a program executed by the CPU 101, and can be configured using dynamic random access memory (DRAM), static random access memory (SRAM), a hard disk drive (HDD) and/or a flash memory. The memory 103 may also include a volatile memory unit configured using a DRAM, and a nonvolatile memory unit configured using an HDD. The nonvolatile memory unit can store a variety of software capable of being executed on the terminal apparatus 10, such as an operating system. The volatile memory unit can store an application that has been read from the nonvolatile memory unit and is currently being executed on the terminal apparatus 10.

The touch panel 104 is equipped with a function for presenting information to the user using a liquid crystal element, an organic electroluminescent (EL) element, an electrophoretic element, etc., and a function for detecting a user operation using a capacitive sensing system, resistive film system, etc. In place of the touch panel 104, a device equipped with a function for presenting information to the user and a device equipped with a function for detecting a user operation may be provided separately in the terminal apparatus 10. Devices equipped with the former function may include, inter alia, a display panel, a speaker, and a vibrator. Devices equipped with the latter function may include, inter alia, a keyboard, a button, a touch pad, a mouse, a microphone, and a gyro-sensor. Furthermore, a plurality of the examples given here may be provided in the terminal apparatus 10 in addition to the touch panel 104. For example, the terminal apparatus 10 may be equipped with the touch panel 104, a speaker, and a vibrator.

The GPS receiver 105 has functions for receiving a signal sent from a GPS satellite and identifying a current location.

The timer 106 may be of any configuration as long as it is a device that is capable of measuring time. For example, the timer 106 may be equipped with a crystal oscillator.

Figure 3:
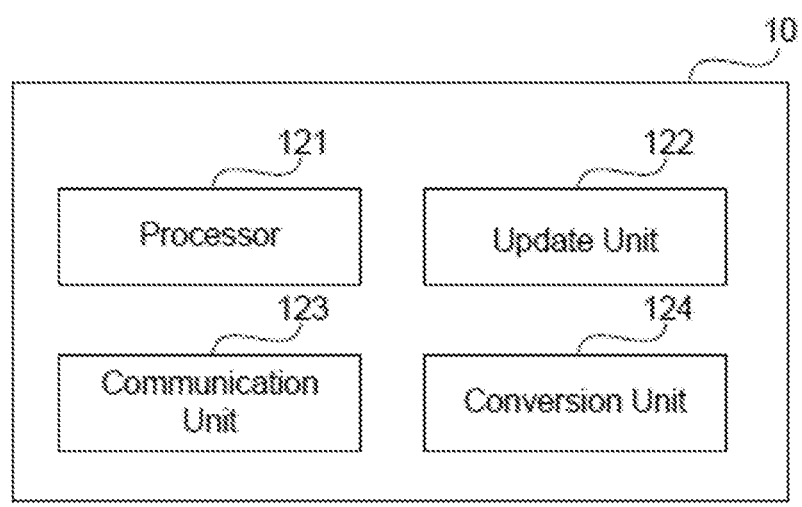
FIG. 3 is a block diagram showing an example of functions realized by the terminal apparatus.

FIG. 3 is a block diagram showing an example of functions realized by the terminal apparatus 10 shown in FIG. 1. The terminal apparatus 10 shown in FIG. 3 has a processor 121, an update unit 122, a communication unit 123, and a conversion unit 124. Furthermore, the terminal apparatus according to one embodiment of the present invention is not limited solely to the plurality of functions shown in FIG. 3. That is, a terminal apparatus to which functions not shown in FIG. 3 have been added can be used as the terminal apparatus according to one embodiment of the present invention.

The processor 121 is equipped with a function for performing arithmetic processing on various signals. For example, the processor 121 is equipped with a function for performing arithmetic processing in accordance with a terminal apparatus 10 operation by the user. The functions of the processor 121 are realized, inter alia, by the CPU 101 shown in FIG. 2.

The update unit 122 is equipped with functions for updating existing information. For example, there are provided functions for updating existing information stored in the terminal apparatus on the basis of the results of arithmetic processing executed in the processor 121 when executing an application, or application-related information sent from the server apparatus 20. The functions of the update unit 122 are realized, inter alia, by the CPU 101 and the memory 103 shown in FIG. 2.

The communication unit 123 is equipped with functions for sending a signal to the server apparatus 20, and receiving a signal sent by the server apparatus 20. For example, the communication unit 123 is equipped with functions for sending a signal to the server apparatus 20 requesting permission to execute a specific application, and for receiving a signal that includes information required when executing the specific application. In addition, the communication unit 123 is equipped with a function for sending to the server apparatus 20 a signal including at least one of the above-described location information or distance information. The functions of the communication unit 123 are realized, inter alia, by the CPU 101, the antenna 102, and the GPS receiver 105 shown in FIG. 2.

The conversion unit 124 is equipped with functions for converting a nonelectrical signal, such as a terminal apparatus 10 operation by the user, to an electrical signal, and for converting an electrical signal to a signal that is perceptible by the user. For example, there is provided functionality for converting a user's touch on a display screen of the terminal apparatus 10 to an electrical signal, and converting an electrical signal sent to the terminal apparatus 10 from the server apparatus 20 to an image, a video, a sound, and/or a vibration of the terminal apparatus 10. The functions of the conversion unit 124 are realized, inter alia, by the CPU 101 and the touch panel 104 shown in FIG. 2.

(2) Server Apparatus

Figure 4:
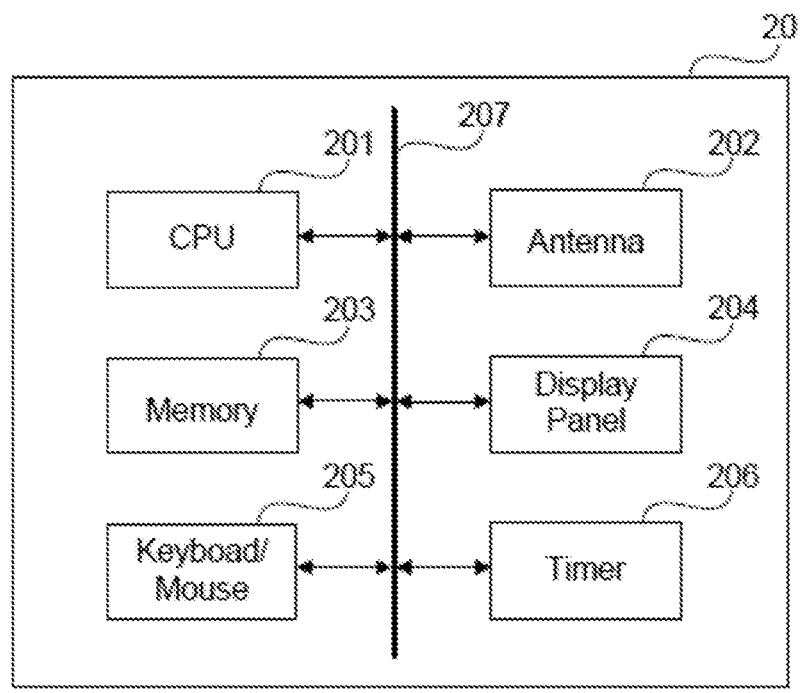
FIG. 4 is a diagram showing an example of the configuration of a server apparatus.

FIG. 4 is a diagram showing an example of the configuration of the server apparatus 20 shown in FIG. 1. The server apparatus 20 shown in FIG. 4 includes a CPU 201, an antenna 202, a memory 203, a display 204, a keyboard/mouse 205, and a timer 206. The components are electrically connected to one another via a bus 207. The server apparatus according to one embodiment of the present invention is not limited solely to the configuration of the server apparatus 20 shown in FIG. 4. That is, a server apparatus to which components not shown in FIG. 4 have been added can be used as the server apparatus according to one embodiment of the present invention. The server apparatus according to one embodiment of the present invention is not limited to a server apparatus that is equipped with all of the plurality of components shown in FIG. 4. For example, a server apparatus that does not have the timer 206 can also be used as the server apparatus according to one embodiment of the present invention.

The CPU 201 can execute a command included in software that is stored in the memory 203. Specifically, the CPU 201 is able to control the antenna 202 for sending a signal that includes various information to the terminal apparatus 10, arithmetic processing on the basis of a keyboard/mouse 205 operation by the provider, control the display 204 for presenting a provider with specific information, and control the timer 206 for measuring time.

In addition, the CPU 201 is also able to cause at least one of the location information or distance information that was sent from the terminal apparatus 10 to be stored in the memory 203, to calculate the cumulative distance between a plurality of other points through which the terminal apparatus 10 has passed in the real world and cause this cumulative distance to be stored in the memory 203, and to set a reward for granting to the terminal apparatus 10 in accordance with the cumulative distance and cause this reward to be stored in the memory 203. The CPU 201 can control the antenna 202 so as to send a signal for indicating to the user of the terminal apparatus 10 that the reward is selectable, and can control the antenna 202 so as to send a signal for granting the reward to the user of the terminal apparatus 10.

The memory 203 is used to store a program executed by the CPU 201, and is configured using, inter alia, DRAM, SRAM, an HDD, and/or a flash memory. The memory 203 may also include a volatile memory unit configured using a DRAM, and a nonvolatile memory unit configured using an HDD. The nonvolatile memory unit can store a variety of software capable of being executed on the server apparatus 20, such as an operating system. The volatile memory unit can store software that has been read from the nonvolatile memory unit and is currently being executed on the server apparatus 20.

The display panel 204 is equipped with a function for performing a display using, inter alia, a liquid crystal element or an organic EL element.

The timer 206 may be any type of device as long as it is a device that is capable of measuring time. For example, the timer 206 may be a crystal oscillator.

Figure 5:
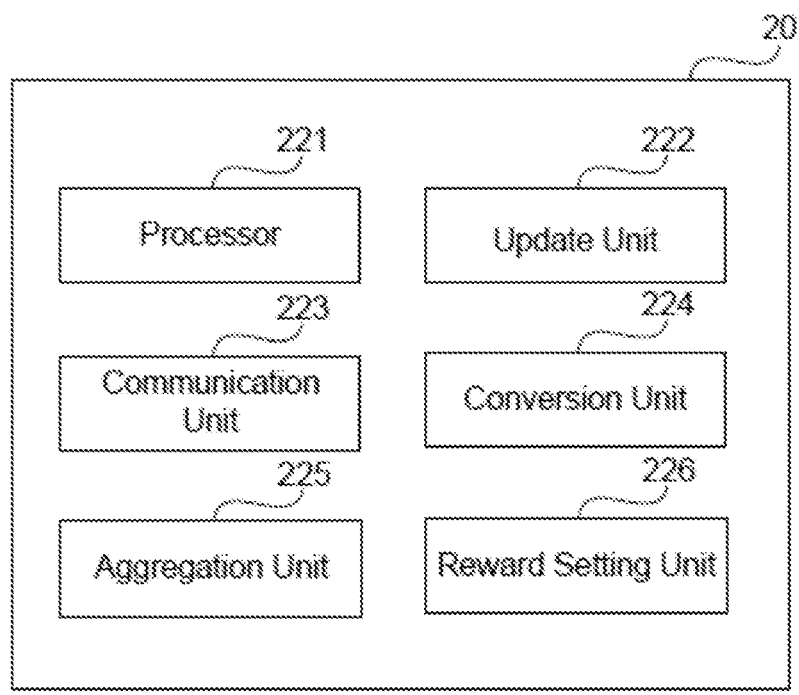
FIG. 5 is a block diagram showing an example of functions realized by the server apparatus.

FIG. 5 is a block diagram showing an example of functions realized by the server apparatus 20 shown in FIG. 1. The server apparatus 20 shown in FIG. 5 has a processor 221, an update unit 222, a communication unit 223, a conversion unit 224, an aggregation unit 225, and a reward setting unit 226. Furthermore, the server apparatus according to one embodiment of the present invention is not limited solely to the plurality of functions shown in FIG. 5. That is, a server apparatus to which functions not shown in FIG. 5 have been added can be used as the server apparatus according to one embodiment of the present invention.

The processor 221 is equipped with functions for performing arithmetic processing on various signals. For example, the processor 221 is equipped with functions for performing arithmetic processing in accordance with a server apparatus 20 operation by the provider and/or a signal sent from the terminal apparatus 10. The functions of the processor 221 are realized, inter alia, by the CPU 101 shown in FIG. 4.

The update unit 222 is equipped with functions for updating existing information. For example, there is provided functions for updating existing information stored in the server apparatus 20 on the basis of a signal including the results of arithmetic processing executed in the processor 221, or update information for user information sent from the terminal apparatus 10. In addition, the update unit 222 is equipped with functions for storing the above-described location information and distance information, cumulative distance, and reward as user information. The functions of the update unit 222 are realized, inter alia, by the CPU 101 and the memory 102 shown in FIG. 4.

The communication unit 223 is equipped with functions for receiving a signal sent by the terminal apparatus 10, and sending a signal to the terminal apparatus 10. For example, the communication unit 223 is equipped with functions for receiving a signal from the terminal apparatus 10 requesting permission to execute a specific application, and for sending a signal that includes information required for executing the specific application in the terminal apparatus 10. In addition, the communication unit 223 is equipped with functions for receiving from the terminal apparatus 10 a signal including at least one of the above-described location information or distance information, and for sending to the terminal apparatus 10 a signal for presenting the above-described reward and a signal for granting the reward. The functions of the communication unit 223 are realized, inter alia, by the CPU 201 and the antenna 202 shown in FIG. 4.

The conversion unit 224 is equipped with functions for converting a nonelectrical signal, such as a server apparatus 20 operation by the provider, to an electrical signal, and for converting an electrical signal to a signal that is perceptible by the provider. For example, there is provided functions for converting a pressing force on the keyboard of the server apparatus 20 to an electrical signal, and converting an electrical signal to an image or a video to be displayed on the server apparatus 20. The functions of the conversion unit 224 are realized, inter alia, by the CPU 201, display panel 204, and the keyboard/mouse 205 shown in FIG. 4.

The aggregation unit 225 is equipped with functions for calculating, on the basis of at least one of the above-described location information or distance information, the cumulative distance between a plurality of other points through which the terminal apparatus 10 has passed in the real world. For example, on the basis of the location information of the terminal apparatus 10 at a plurality of times, the aggregation unit 225 is able to calculate the cumulative distance between a plurality of other points through which the terminal apparatus 10 has passed in the real world during a fixed period of time, and to aggregate all the specific point-to-point distance information sent from the terminal apparatus 10 during the fixed period of time, and calculate the cumulative distance between the plurality of other points through which the terminal apparatus 10 has passed in the real world. The functions of the aggregation unit 225 are realized, inter alia, by the CPU 201 and the memory 203 shown in FIG. 4.

The reward setting unit 226 is equipped with functions for setting a reward for granting to the terminal apparatus 10 in accordance with the cumulative distance. The reward may include points required when executing a specific application or when executing a specific event in the specific application in the terminal apparatus 10 (for example, points necessary when executing a specific dungeon of a specific game). The reward may also include an image or a video capable of being displayed on the terminal apparatus 10. In addition, it is also possible for the reward setting unit 226 to selectively set a plurality of rewards, that is, to set a plurality of options that the user of the terminal apparatus 10 can select as rewards. The functions of the reward setting unit 226 are realized, inter alia, by the CPU 201 and the memory 203 shown in FIG. 4.

(3) Processing Sequence

Figure 6:
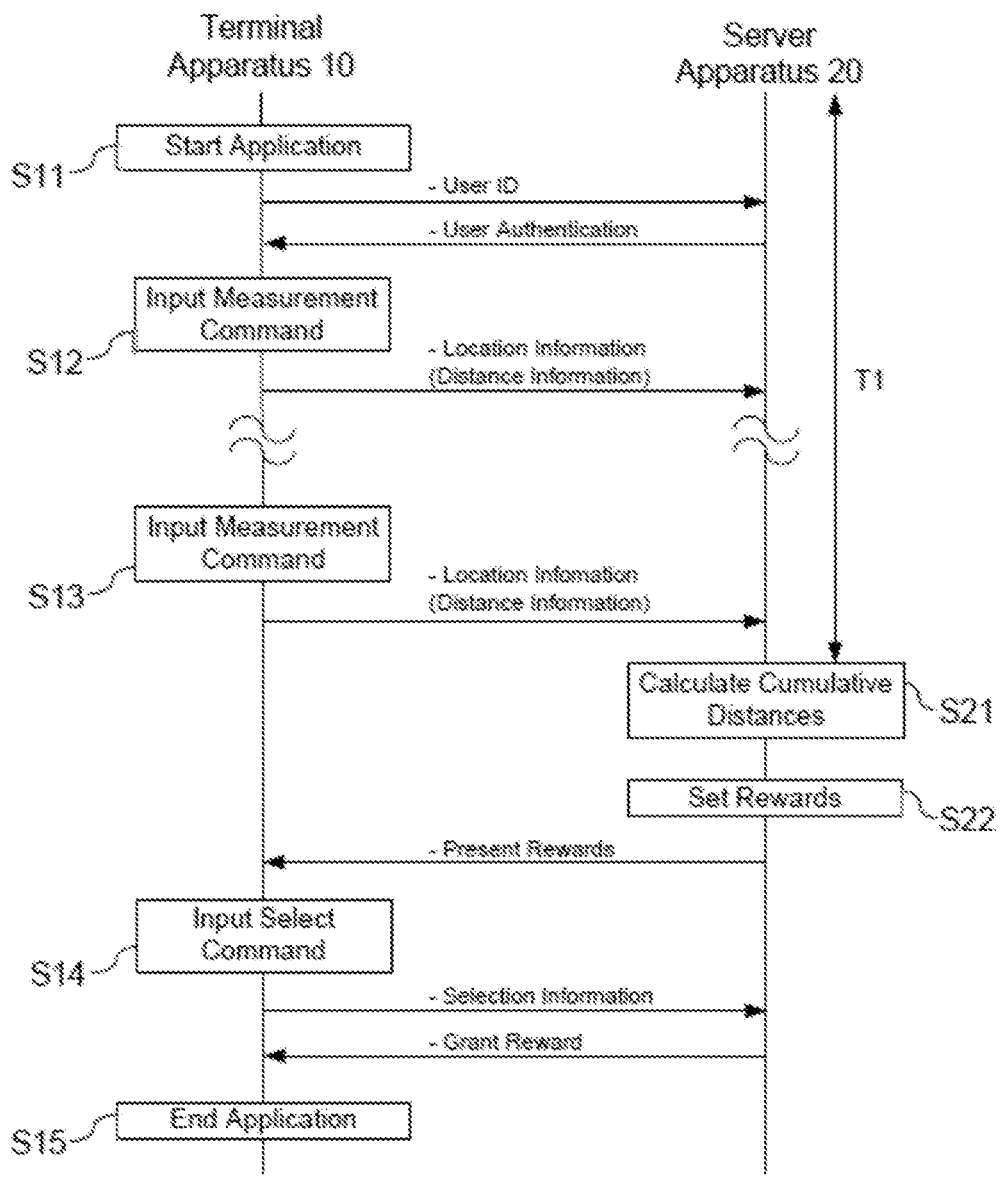
FIG. 6 is a diagram showing an example of a processing sequence in the system.

FIG. 6 is a diagram showing an example of a processing sequence according to one embodiment of the present invention.

In the sequence shown in FIG. 6, first, an application is started in the terminal apparatus 10 (S11). The application, for example, may include a game or the like. Then, the terminal apparatus 10 sends to the server apparatus 20 a signal that includes information for identifying the selected application, and information (ID) for identifying the user who is using the terminal apparatus 10.

Next, user authentication is performed in the server apparatus 20 on the basis of the user identification information. Then, the server apparatus 20 sends the terminal apparatus 10 a signal including information that is related to the user and that is required for application execution. For example, saved game data is sent to the terminal apparatus 10. This makes it possible to execute the application on the terminal apparatus 10. For example, the saved data can be used as the starting point for continuing a game on the terminal apparatus 10.

Next, in accordance with a user operation in the application (input of a measurement command), the terminal apparatus 10 sends the server apparatus 20 a signal including at least real-world location information or specific point-to-point distance information calculated on the basis of the location information (S12). The location information, for example, may include information on the location of the terminal apparatus 10 at the point in time at which the measurement command was inputted. The distance information, for example, may include information related to a straight-line distance between the location of the terminal apparatus 10 at the point in time at which the application was started and the location of the terminal apparatus 10 at the point in time at which the measurement command was initially inputted. Furthermore, the measurement command can be inputted to the terminal apparatus 10 a plurality of times (S13). Then, the distance information at the point in time at which the measurement command is inputted for the k-th time (k being a natural number of 2 or greater), for example, may include information related to the straight-line distance between the location of the terminal apparatus 10 at the point in time at which the measurement command was inputted for the (k−1)th time and the location of the terminal apparatus 10 at the point in time at which the measurement command was inputted for the k-th time.

Table 1 is a graphic showing an example of the location information of four users having "User ID: A" to "User ID: D" at the points in time at which an application was started and the points in time at which the measurement command was inputted during a time period T1. Table 2 is a graphic showing an example of the distance information of the four users calculated in the terminal apparatuses 10 at the points in time at which the measurement command was inputted during the time period T1. In the processing sequence shown in FIG. 6, the server apparatus 20 calculates the cumulative distance for each time period T1 (e.g., 24 hours).

TABLE 1

|  | User ID | | | |
| --- | --- | --- | --- | --- |
|  | A | B | C | D |
| At application startup | EL: a0, NL: b0 | EL: c0, NL: d0 | EL: e0, NL: f0 | EL: g0, NL: h0 |
| First time | EL: a1, NL: b1 | EL: c1, NL: d1 | EL: e1, NL: f1 | EL: g1, NL: h1 |
| Second time | EL: a2, NL: b2 | EL: c2, NL: d2 | EL: e2, NL: f2 | EL: g2, NL: h2 |
| Third time | EL: a3, NL: b3 | — | EL: e3, NL: f3 | EL: g3, NL: h3 |
| Fourth time | EL: a4, NL: b4 | — | — | EL: g4, NL: h4 |
| Fifth time | EL: a5, NL: b5 | — | — | EL: g5, NL: h5 |
| Sixth time | EL: a6, NL: b6 | — | — | EL: g6, NL: h6 |
| Seventh time | — | — | — | EL: g7, NL: h7 |

*EL: East Longitude, NL: North Latitude

TABLE 2

|  | User ID | | | |
| --- | --- | --- | --- | --- |
|  | A | B | C | D |
| First time | 2.1 km | 30.8 km | 160.8 km | 1.3 km |
| Second time | 1.5 km | 0.5 km | 156.2 km | 1.4 km |
| Third time | 6.8 km | — | 10.2 km | 1.7 km |
| Fourth time | 1.2 km | — | — | 0.6 km |
| Fifth time | 2.3 km | — | — | 0.9 km |
| Sixth time | 6.3 km | — | — | 1.4 km |
| Seventh time | — | — | — | 1.8 km |

In the system according to one embodiment of the present invention, the terminal apparatuses 10 send signals including the information shown in Tables 1 and 2 to the server apparatus 20, and the server apparatus 20 stores this information. Because sending signals from the terminal apparatuses 10 to the server apparatus 20 is dependent on user operations, the number of pieces of location information and distance information stored in the server apparatus 20 may differ for each user as listed in Tables 1 and 2.

Next, on the basis of at least one of the location information or the distance information, the server apparatus 20 calculates the cumulative distances between a plurality of other points through which the terminal apparatuses 10 have passed in the real world (S21). For example, when the cumulative distances are calculated on the basis of the information listed in Table 2 above, the cumulative distances shown in Table 3 can be calculated. Then, the server apparatus 20 stores the information related to the calculated cumulative distances.

TABLE 3

| User ID | | | | |
|---|---|---|---|---|
| | A | B | C | D |
| Cumulative distance | 20.2 km | 31.3 km | 327.2 km | 9.1 km |

Next, the server apparatus 20 sets rewards for granting to the users of the terminal apparatuses 10 on the basis of the cumulative distances (S22). For example, the server apparatus 20 can stipulate beforehand correspondences between cumulative distances and rewards as shown in Table 4, and is able to set the rewards for granting to the users in accordance with the correspondences as shown in Table 5. Then, the server apparatus 20 stores information related to the set rewards. The "app points" shown in Table 4 signify points needed when executing a specific event in a specific application (e.g. points needed when executing a specific dungeon in a specific game). The "image" shown in Table 4 may include wallpaper for the display screen of the terminal apparatus 10, and the "video" may include a video including information related to a specific event in a specific application (e.g., a video including valuable information for clearing a specific dungeon of a specific game).

TABLE 4

| | Reward | |
|---|---|---|
| Cumulative distance | App points | Content |
| 0-10 km | Convert one km to one point (rounding up to the nearest whole number) | — |
| 10-20 km | | Image a |
| 20-30 km | | Image b |
| 30-50 km | | Image c |
| 50-100 km | 50 points | Video A |
| 100-300 km | 50 points | Video B |
| 300 km- | 50 points | Video C |

TABLE 5

| | User ID | | | |
|---|---|---|---|---|
| | A | B | C | D |
| Reward | 21 pts or Image a | 32 pts or Image c | 50 pts or Video C | 10 pts |

Next, the server apparatus 20 sends the terminal apparatus 10 a signal instructing the presentation of the set rewards. Then, the terminal apparatus 10 presents the rewards to the user in response to an operation by the user in the application.

Next, the terminal apparatus 10 sends a signal including information (selection information) related to a selected reward to the server apparatus 20 in response to a user operation in the application (input of a select command) (S14). Then, the server apparatus 20 grants the selected reward to the terminal apparatus 10.

Thereafter, the application on the terminal apparatus 10 ends.

A. Terminal Apparatus Operations

Figure 7:
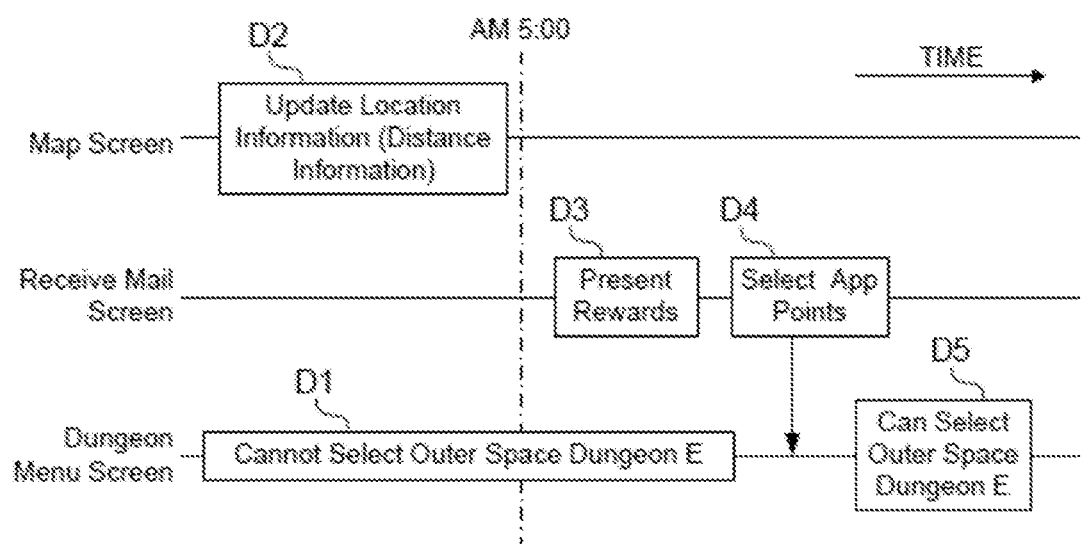
FIG. 7 is a diagram showing an example of an overview of display screen transitions on the terminal apparatus.

FIG. 7 is a diagram showing an overview of display screen transitions on the terminal apparatus 10 when performing the processing sequence shown in FIG. 6. FIGS. 8 to 14 are diagrams showing examples of the terminal apparatus 10 display screen at each point in time shown in FIG. 7.

An example of a case in which the application represented in FIG. 6 is a game in which it is possible to display a map screen, a receive email screen, and a dungeon menu screen will be described below. As used here, the map screen is a screen capable of displaying real-world location information for the terminal apparatus 10, the receive email screen is a screen that makes it possible to read an email received by the terminal apparatus 10, and the dungeon menu screen is a screen for displaying selectable dungeons. Furthermore, hereinbelow it is assumed that the calculation of the cumulative distance on the server apparatus 20 is performed at 5 AM every day.

Figure 8:
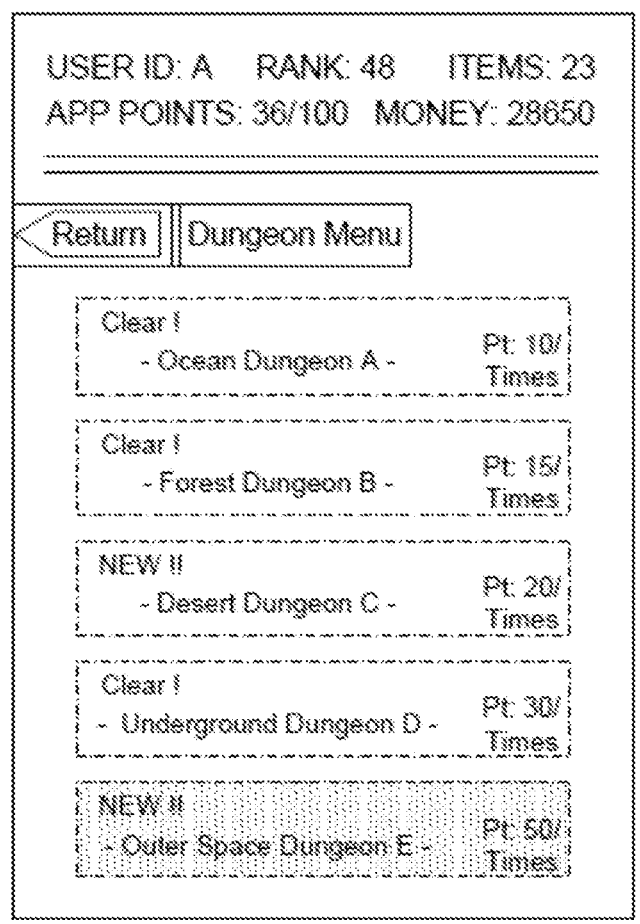
FIG. 8 is a diagram showing an example of a display screen of the terminal apparatus.

FIG. 8 is a diagram showing an example of the dungeon menu screen corresponding to "D1" of FIG. 7. In the dungeon menu screen shown in FIG. 8, a plurality of dungeons and the app points needed when executing a dungeon are listed together. The app points (36 pts) owned by the user having "User ID: A" does not meet the app points (50 pts) needed to execute "Outer Space Dungeon E", and therefore the "Outer Space Dungeon E" cannot be selected.

Figure 9:
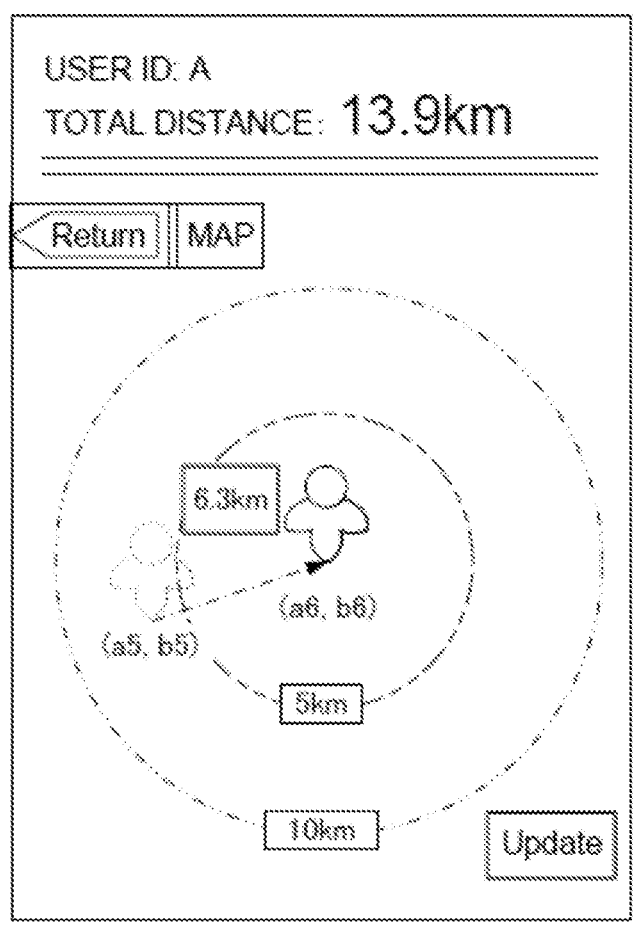
FIG. 9 is a diagram showing an example of a display screen of the terminal apparatus.
Figure 10:
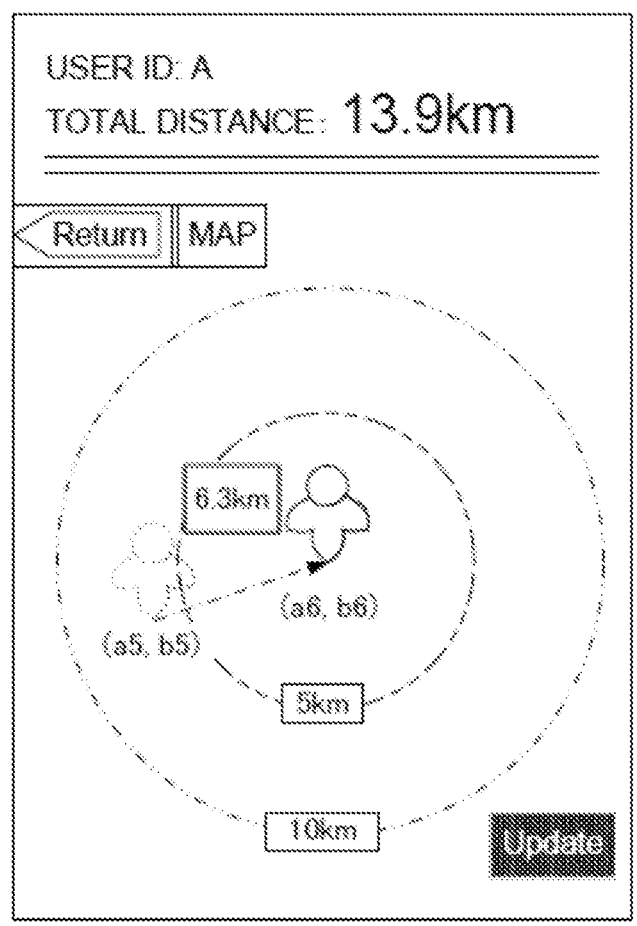
FIG. 10 is a diagram showing an example of a display screen of the terminal apparatus.
Figure 11:
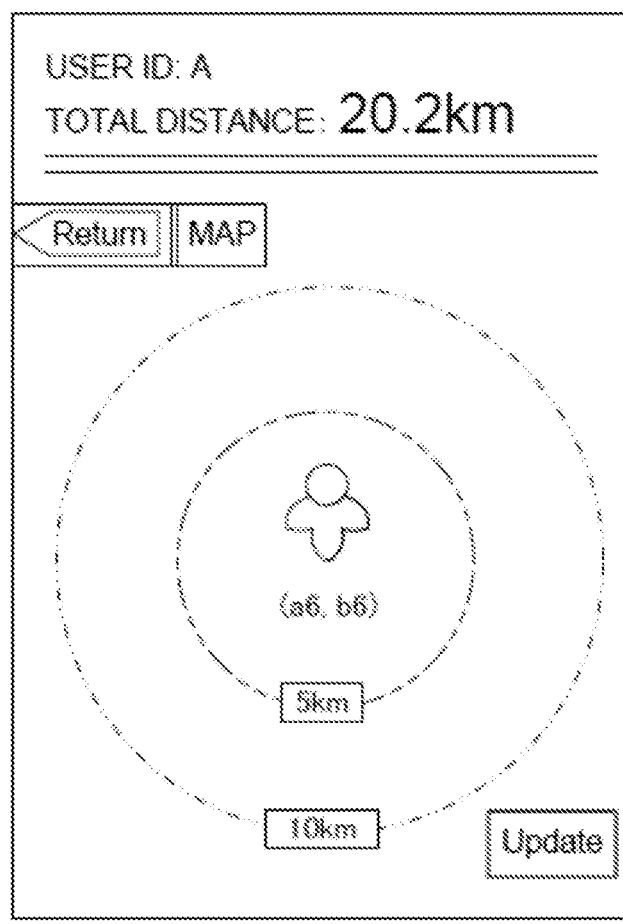
FIG. 11 is a diagram showing an example of a display screen of the terminal apparatus.

FIGS. 9 to 11 are diagrams chronologically showing examples of map screens corresponding to "D2" of FIG. 7. The map screen shown in FIG. 9 shows a correlation between a point (dotted line portion) where the measurement command was inputted previously (where the "Update" button was touched) and a current point (solid line portion), and the distance therebetween (6.3 km). The map screen shown in FIG. 9 also shows the cumulative distance (13.9 km) aggregated during a specific time period. The map screen shown in FIG. 10 shows that the measurement command was inputted (the "Update" button was touched). The map screen shown in FIG. 11 shows the increase in the cumulative distance (20.2 km) at this time in line with the measurement command having been inputted ("Update" button having been touched) once again.

The calculation of the cumulative distance and the setting of the rewards are performed in the server apparatus 20 at this point.

Figure 12:
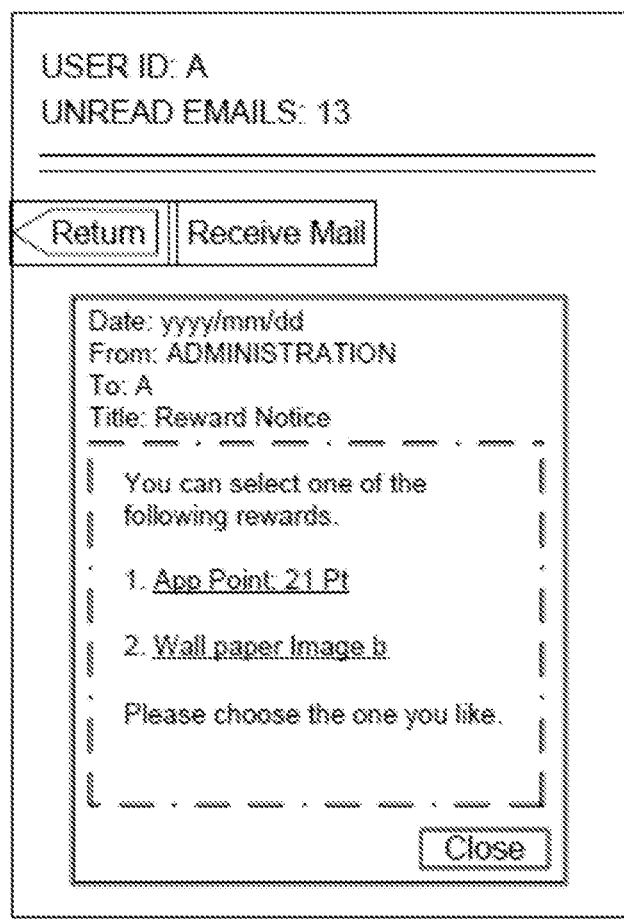
FIG. 12 is a diagram showing an example of a display screen of the terminal apparatus.

FIG. 12 is a diagram showing an example of the receive email screen corresponding to "D3" of FIG. 7. The receive email screen shown in FIG. 12 shows a plurality of options (21 app points and wallpaper image b) that the terminal apparatus 10 user can select as a reward.

Figure 13:
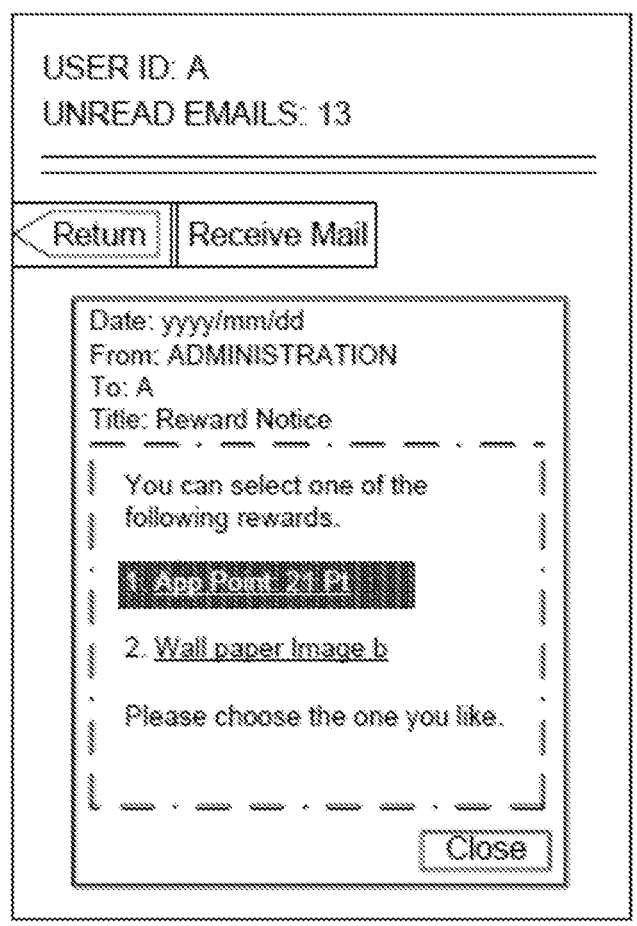
FIG. 13 is a diagram showing an example of a display screen of the terminal apparatus.

FIG. 13 is a diagram showing an example of the receive email screen corresponding to "D4" of FIG. 7. The receive email screen shown in FIG. 13 shows that the app points have been selected as the reward.

Figure 14:
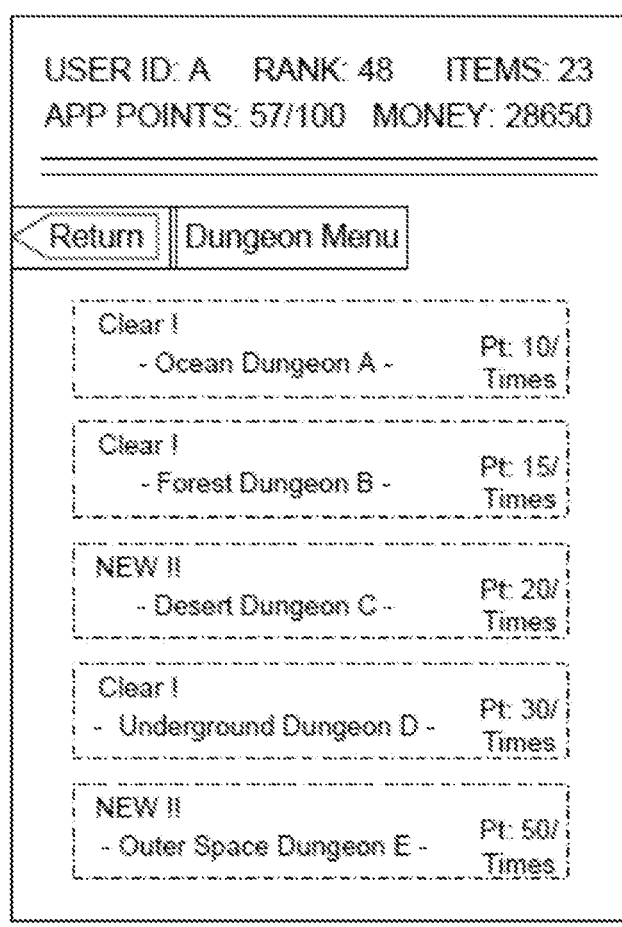
FIG. 14 is a diagram showing an example of a display screen of the terminal apparatus.

FIG. 14 is a diagram showing an example of the dungeon menu screen corresponding to "D5" of FIG. 7. The dungeon menu screen shown in FIG. 14 shows an increase in app points (57 pts), making the selection of the "Outer Space Dungeon E" possible.

B. Server Apparatus Operations

Figure 15:
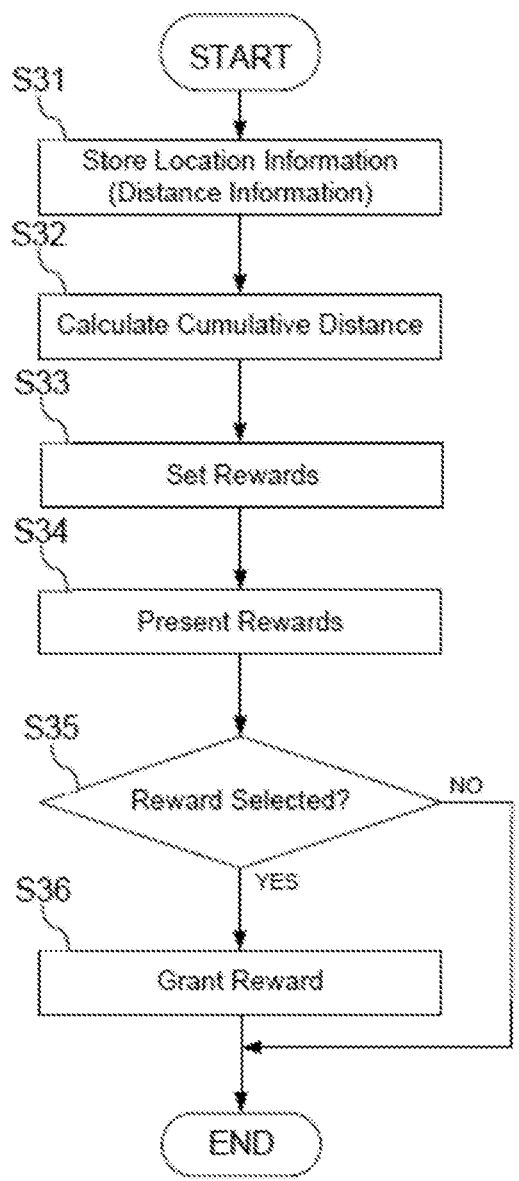
FIG. 15 is a flowchart showing an example of server apparatus operations.

FIG. 15 is a flowchart showing an example of the server apparatus 20 operations when the processing sequence shown in FIG. 6 is performed.

In the server apparatus 20, first the update unit 222 stores at least one of the location information or the distance information sent from the terminal apparatus 10 (S31). Next, the aggregation unit 225, on the basis of at least one of the location information or the distance information, calculates the cumulative distance between a plurality of other points through which the terminal apparatus 10 has passed in the real world (S32). Next, the reward setting unit 226, in accordance with the cumulative distance, sets rewards for granting to the terminal apparatus 10 (S33). Next, the communication unit 223 sends the terminal apparatus 10 a signal instructing that the rewards be presented to the user (S34). Then, upon receiving a signal indicating that the user has selected a reward, the communication unit 223 sends a signal for granting the reward to the terminal apparatus 10 (S35, S36).

(4) Summary

The server apparatus, method, and non-transitory computer-readable medium according to one embodiment of the present invention described above, for example, can be expressed as follows.

The server apparatus can be expressed as an apparatus comprising: a communication unit for receiving a signal including at least one of location information or specific point-to-point distance information calculated on the basis of the location information sent from the terminal apparatus; an aggregation unit for calculating, on the basis of at least one of the location information or the distance information, a cumulative distance between a plurality of other points through which the terminal apparatus has passed in the real world; and a reward setting unit for setting rewards for granting to the terminal apparatus in accordance with the cumulative distance.

The method can be expressed as a method comprising: the communication unit of the server apparatus receiving a signal that includes at least one of the location information or the specific point-to-point distance information calculated on the basis of the location information sent from the terminal apparatus; the aggregation unit of the server apparatus calculating, on the basis of at least one of the location information or the distance information, the cumulative distance between the plurality of other points through which the terminal apparatus has passed in the real world; and the reward setting unit of the server apparatus setting the rewards for granting to the terminal apparatus in accordance with the cumulative distance.

The non-transitory computer-readable medium can be expressed as a non-transitory computer-readable in which a computer program is stored, the computer program causing a computer for transmitting and receiving signals to and from the terminal apparatus to function as: the communication unit for receiving the signal that includes at least one of the location information or the specific point-to-point distance information calculated on the basis of the location information sent from the terminal apparatus; the aggregation unit for calculating, on the basis of at least one of the location information or the distance information, the cumulative distance between the plurality of other points through which the terminal apparatus has passed in the real world; and the reward setting unit for setting the reward for granting to the terminal apparatus in accordance with the cumulative distance.

The server apparatus, method, and non-transitory computer-readable medium can grant the user of a terminal apparatus rewards in the virtual world in accordance with movements in the real world. This, for example, achieves the effect of enabling an online game to be closely associated with the daily life of the user, and making it possible to arouse user interest in the online game.

2. Variations

The one embodiments of the present invention described above are examples, and these examples can be changed as appropriate. For example, the one embodiments of the present invention can be modified as follows. Furthermore, it is also possible for a plurality of the variations described below to be combined as an embodiment of the present invention.

(1) Variation 1

In the processing sequence shown in FIG. 6, there is shown a configuration in which the sending from the terminal apparatus 10 to the server apparatus 20 of the signal including at least one of the location information or the distance information, and the granting of the reward from the server apparatus 20 to the terminal apparatus 10 are performed in a single application running on the terminal apparatus 10, but the configuration may be such that the sending and the granting are performed in separate applications. For example, the configuration may be such that the sending is performed while executing a first application, and the granting is performed while executing a second application that differs from the first application (Refer to FIG. 16).

Figure 16:
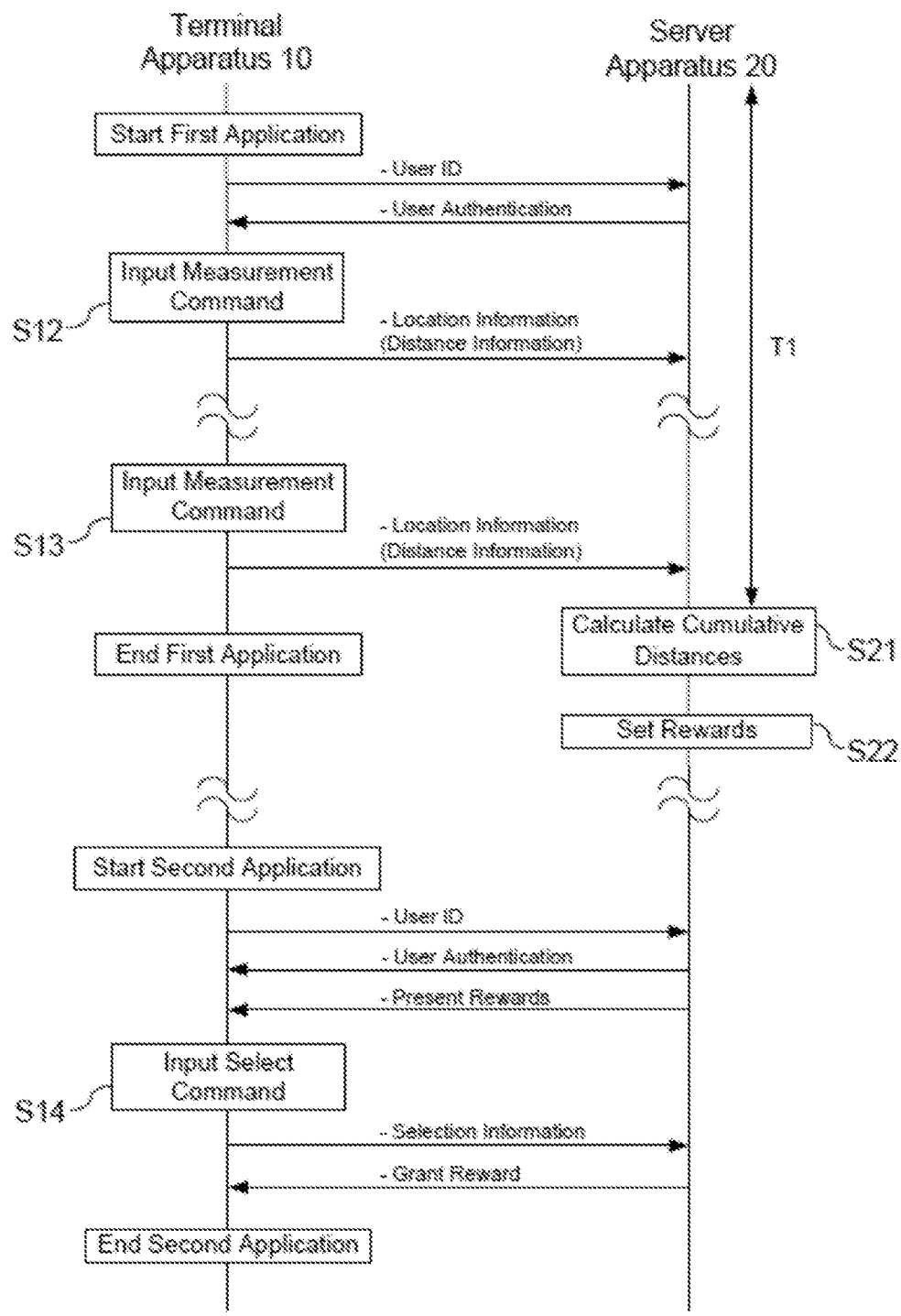
FIG. 16 is a diagram showing an example of a processing sequence in the system.

It is preferable that the configuration shown in FIG. 16 be able to realize the granting of the reward described above without significantly changing the design of the existing application (the second application) in contrast to the configuration shown in FIG. 6. However, in contrast to the configuration shown in FIG. 16, it is preferable that the configuration shown in FIG. 6 be able to reduce the capacities of the memories in the terminal apparatus 10 and the server apparatus 20 required for realizing the above-described granting of the reward.

(2) Variation 2

In the processing sequence shown in FIG. 6, there is shown a configuration in which the sending of the signal including at least one of the location information or the distance information from the terminal apparatus 10 to the server apparatus 20 is performed in accordance with a user operation (the input of a measurement command) in the application (a configuration in which the receiving of the signal by the communication unit 223 described in FIG. 5 is performed on an irregular basis in accordance with a terminal apparatus 10 operation), but the configuration may be such that the sending is performed automatically as long as the terminal apparatus 10 power is ON. For example, the configuration may be such that the sending of the signal including at least one of the location information or the distance information from the terminal apparatus 10 to the server apparatus 20 is performed at intervals of a fixed time period T2 (a configuration in which the receiving of the signal by the communication unit 223 described in FIG. 5 is performed at fixed time intervals) (Refer to FIG. 17).

Figure 17:
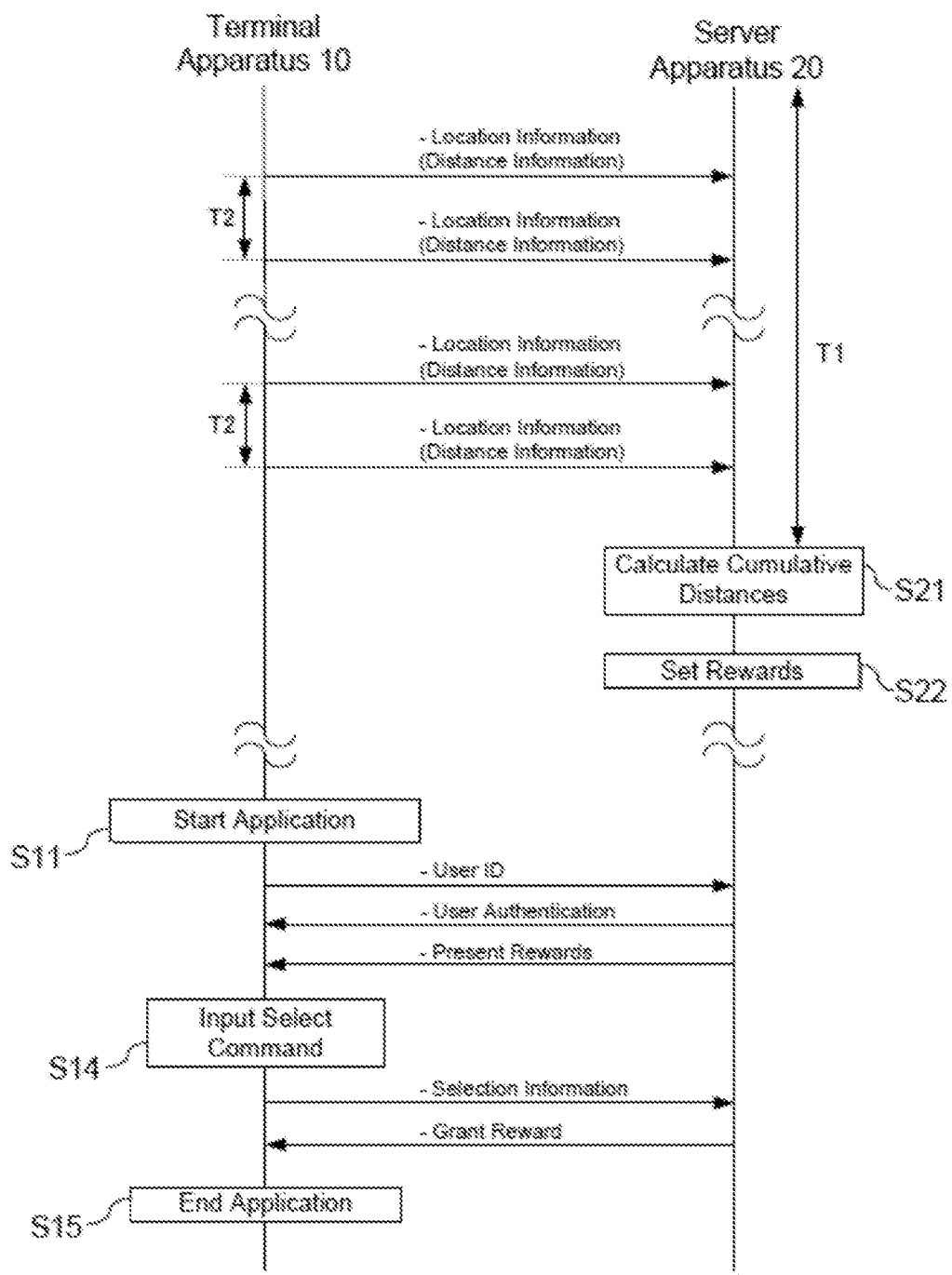
FIG. 17 is a diagram showing an example of a processing sequence in the system.

It is preferable that the configuration shown in FIG. 17 be able to realize the granting of the rewards described above without causing trouble to the user of the terminal apparatus 10 in contrast to the configuration shown in FIG. 6. However, in contrast to the configuration shown in FIG. 17, it is preferable that the configuration shown in FIG. 6 enable the user of the terminal apparatus to input the measurement command at any time, and make it possible to suppress needless operations by the terminal apparatus 10 (be able to reduce the power consumption of the terminal apparatus 10).

Furthermore, in one embodiment of the present invention, it is also possible to have a configuration in which the sending of the signal including at least one of the location information or the distance information from the terminal apparatus 10 to the server apparatus 20 is performed in accordance with a user operation (input of the measurement command) in the application, and is also performed at intervals of a fixed time period T2.

(3) Variation 3

Figure 18:
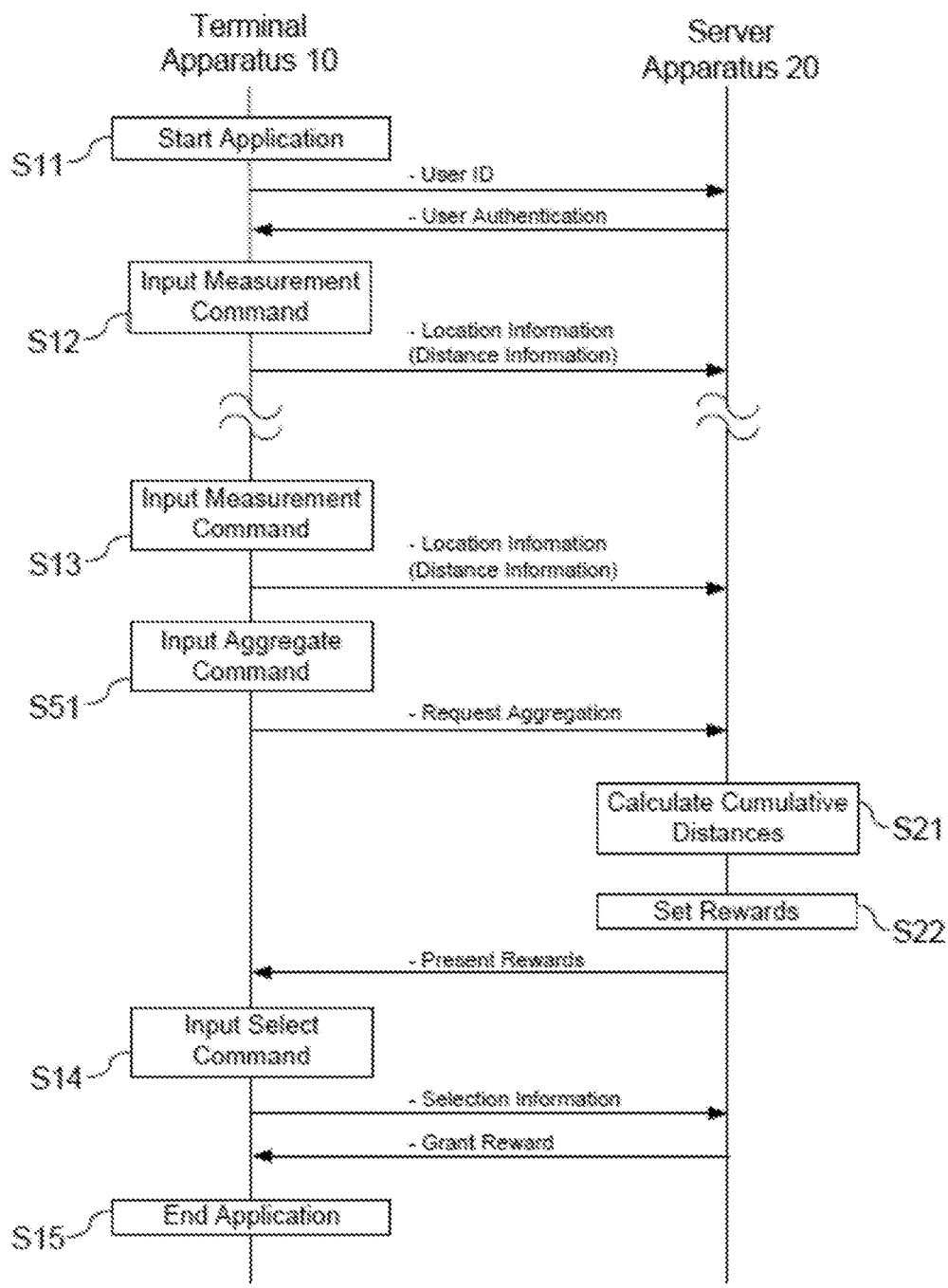
FIG. 18 is a diagram showing an example of a processing sequence in the system.

In the processing sequence shown in FIG. 6, there is shown a configuration in which the calculation of the cumulative distance in the server apparatus 20 is performed at intervals of a fixed time period T1 (a configuration in which the calculation by the aggregation unit 225 shown in FIG. 5 is performed at fixed time intervals), but the configuration may be such that the calculation is performed in accordance with a user operation (input of the aggregate command (S51)) in the application (a configuration in which the calculation by the aggregation unit 225 shown in FIG. 5 is performed when a signal instructing aggregation is sent from the terminal apparatus 10) (Refer to FIG. 18).

It is preferable that the configuration shown in FIG. 18 enable the user of the terminal apparatus 10 to issue an instruction at any time to the server apparatus 20 to calculate the cumulative distance, and make it possible to suppress needless operations by the server apparatus 20 (be able to reduce the power consumption of the server apparatus 20) in contrast to the configuration shown in FIG. 6. However, in contrast to the configuration shown in FIG. 18, it is preferable that the configuration shown in FIG. 6 enable the cumulative distance to be calculated without causing trouble to the user of the terminal apparatus 10.

(4) Variation 4

In the flowchart shown in FIG. 15, there is described a configuration in which the processing ends without the reward being granted when the user of the terminal apparatus 10 has not selected the granted reward, but the configuration may be such that the presentation of the reward continues for a predetermined time period even when the reward has not been selected (Refer to FIG. 19), or the configuration may be such that the presentation of the reward continues with no time limit (not shown). For example, the configuration may be such that the selection of the reward described in the receive email screens shown in FIGS. 12 and 13 be possible over a predetermined time period (a configuration in which the reward setting unit 226 shown in FIG. 5 sets an availability period for the user of the terminal apparatus 10 to acquire the reward), or the configuration may be such that selection is possible without a time limit (a configuration in which the reward setting unit 226 shown in FIG. 5 makes it possible for the user of the terminal apparatus 10 to acquire the reward without establishing a time limit).

Figure 19:
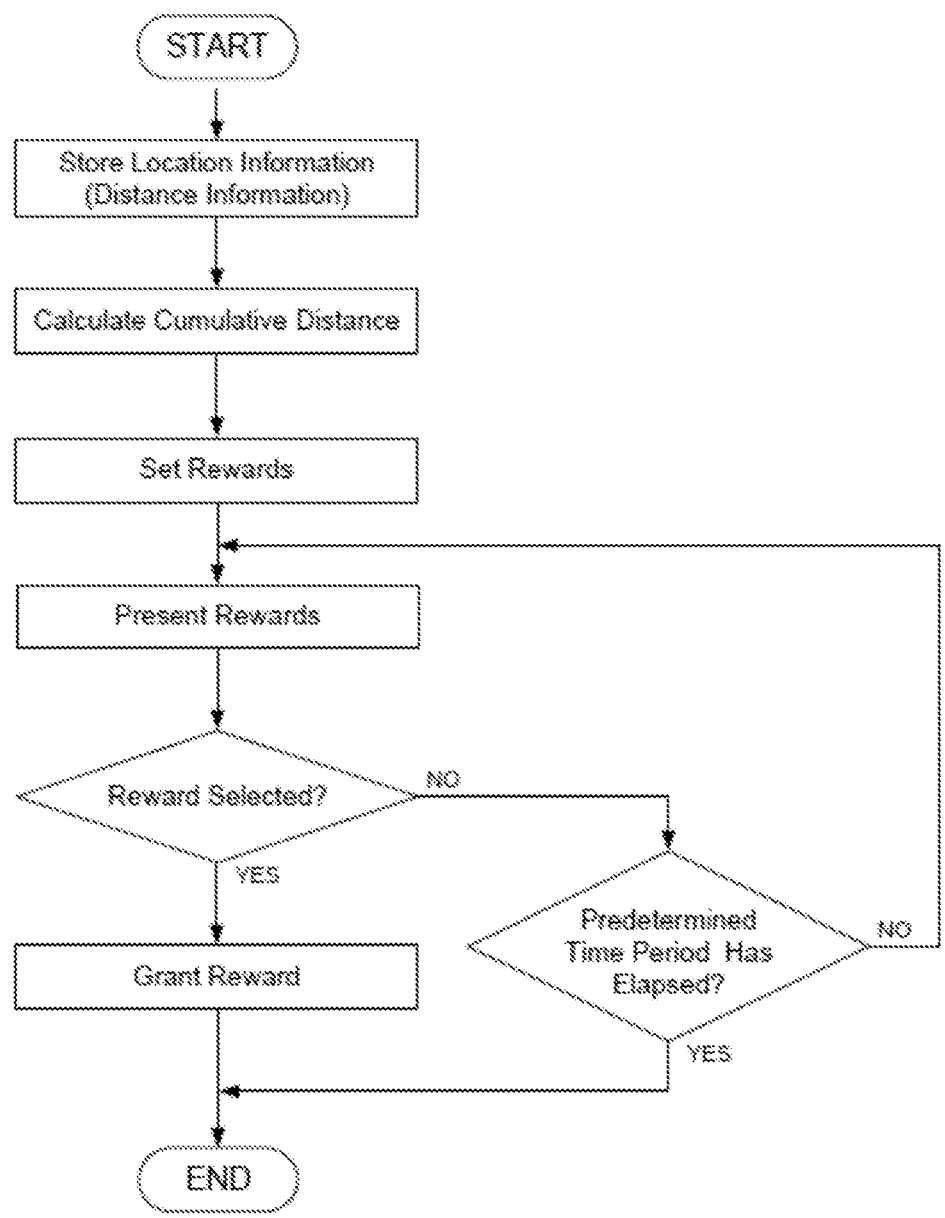
FIG. 19 is a flowchart showing an example of the operation of the server apparatus.

It is preferable that inter alia the configuration shown in FIG. 19 enable the user of the terminal apparatus 10 to acquire the reward at any time in contrast to the configuration shown in FIG. 15. However, in contrast to the configuration and so forth shown in FIG. 19, it is preferable that the configuration shown in FIG. 15 not consume the memory capacity of the server apparatus 20.

3. Supplemental Information

The processes and procedures described in the present specification can be realized not only by the embodiments clearly described in the embodiment, but by software, hardware, or a combination thereof. Specifically, the processes and procedures described in the present specification are realized by causing logic that corresponds to the processes to be mounted on a medium, such as an integrated circuit, a volatile memory, a nonvolatile memory, a magnetic disk, or an optical storage. Furthermore, the processes and procedures explained in the present specification can be executed by implementing the processes and procedures as a computer program, and causing this program to be executed on various computers including the terminal apparatus and the server apparatus.

Even though the processes and procedures described in the present specification have been described as being executed using a single apparatus, piece of software, component, and/or module, these processes or procedures can be executed using a plurality of apparatuses, a plurality of software, a plurality of components, and/or a plurality of modules. Furthermore, even though the various information described in the present specification has been described as being stored in a single memory or storage unit, this information can be stored in a plurality of memories provided in a single apparatus, or stored in a distributed manner in a plurality of memories arranged in a distributed manner in a plurality of apparatuses. In addition, the elements of the software and hardware described in the present specification can be realized by integrating the elements into a smaller number of components, or by dividing the elements among a larger number of components.

What is claimed is:

1. A server apparatus comprising:
a communication device configured to:
receive a game start signal from a terminal apparatus, the game start signal including initial terminal information, the initial terminal information corresponding to an initial location of the terminal device where a game application is executed at a first time, the initial terminal information corresponding to a user ID of a user operating the terminal apparatus, the terminal apparatus having a GPS receiver and a timer, the GPS receiver being configured to identify a location of the terminal apparatus, the timer being configured to count a first period of time;
send a user signal to the terminal apparatus, the user signal including authenticated user information and game information, the authenticated user information corresponding to a result of a user authentication in response to the user ID, the game information being required to continue the game application in the terminal apparatus; and
receive a plurality of first signals from the terminal apparatus during the execution of the game application, the plurality of first signals including first terminal information, the first terminal information corresponding to location information with respect to later locations of the terminal apparatus, the later locations being identified by the GPS receiver and corresponding to locations where the terminal apparatus is located at later times that are different from the first time in a real world;
a memory configured to store computer-readable instructions, the initial terminal information, and the first terminal information; and
a processor configured to execute the computer-readable instructions so as to:
cause the communication device to receive the game start signal;
perform the authentication in response to the user ID;
cause the communication device to send the user signal to the terminal apparatus so as to execute the game application in the terminal apparatus after the processor authenticates the terminal apparatus in response to the user ID;
cause the communication device to receive the plurality of first signals;
cause the memory to store the initial and first terminal information;
calculate a cumulative distance by summing a plurality of distances corresponding to a plurality of locations including the initial and later locations in response to the game start signal and the plurality of first signals;
determine whether the cumulative distance is equal to or less than a predetermined distance or is more than the predetermined distance; and cause the communication device to send a second signal to the terminal apparatus, the second signal including reward information of a new reward that is to be granted to the terminal apparatus, the new reward being set in accordance with the cumulative distance so as to display the reward information on a display of the terminal apparatus during the execution of the game application, wherein the display of the terminal apparatus is configured to display the new reward and a possible reward that will be acquired in the future via the game application, the possible reward is displayed in association with required information corresponding to a future distance that the terminal apparatus will pass in the real world in the future, wherein the new reward is proportional to the cumulative distance when the processor determines that the cumulative distance is equal to or less than the predetermined distance, the new reward is non-proportional to the cumulative distance when the processor determines that the cumulative distance is more than the predetermined distance, and wherein the plurality of first signals are generated in the terminal apparatus when:
　a measurement command is input via the terminal apparatus by the user; and
　when the timer counts a completion of every first period of time.

2. The server apparatus according to claim 1, wherein each of the new reward and the possible reward is a number of points required in the terminal apparatus when the game application stored in a memory of the terminal apparatus is executed by a processor of the terminal apparatus, or when a specific event in the game application is executed by the processor of the terminal apparatus.

3. The server apparatus according to claim 2, wherein the specific event is a dungeon.

4. The server apparatus according to claim 1, wherein each of the new reward and the possible reward is one of an image or a video that is displayed on the display of the terminal apparatus.

5. The server apparatus according to claim 1, wherein the processor is configured to calculate the cumulative distance at a fixed time interval.

6. The server apparatus according to claim 1, wherein the processor is configured to calculate the cumulative distance when the communication device receives a third signal from the terminal apparatus, and
　the third signal includes instruction information that corresponds to a request of the processor to calculate the cumulative distance.

7. The server apparatus according to claim 1, wherein the new reward includes a plurality of options that are selectable by the user of the terminal apparatus.

8. The server apparatus according to claim 1, wherein the new reward includes an availability period during which the user of the terminal apparatus only acquires the new reward.

9. A method for causing a processor to execute computer-readable instructions stored in a memory, the method comprising executing on the processor the steps of:
　receiving a game start signal from a terminal apparatus by a server apparatus, the game start signal including initial terminal information, the initial terminal information corresponding to an initial location of the terminal device where a game application is executed at a first time, the initial terminal information corresponding to a user ID of a user operating the terminal apparatus, the terminal apparatus having a GPS receiver and a timer, the GPS receiver being configured to identify a location of the terminal apparatus, the timer being configured to count a first period of time;
　performing authentication in response to the user ID;
　sending a user signal to the terminal apparatus from the server apparatus after the processor authenticates the terminal apparatus in response to the user ID, the user signal including authenticated user information and game information, the authenticated user information corresponding to a result of a user authentication in response to the user ID, the game information being required to continue the game application in the terminal apparatus;
　receiving a plurality of first signals from the terminal apparatus during the execution of the game application by the server apparatus, the plurality of first signals including first terminal information of the terminal apparatus, the first terminal information corresponding to location information with respect to later locations of the terminal apparatus, the later locations corresponding to locations where the terminal apparatus is located at later times that are different from the first time in a real world;
　storing the initial terminal information and the first terminal information in the memory;
　calculating a cumulative distance by summing a plurality of distances corresponding to a plurality of locations including the initial and later locations in response to the game start signal and the plurality of first signals;
　determining whether the cumulative distance is equal to or less than a predetermined distance or is more than the predetermined distance; and
　sending a second signal to the terminal apparatus from the server apparatus, the second signal including reward information of a new reward that is to be granted to the terminal apparatus, the new reward being set in accordance with the cumulative distance so as to display the reward information on a display of the terminal apparatus during the execution of the game application, wherein the display of the terminal apparatus is configured to display the new reward and a possible reward that will be acquired in the future via the game application, the possible reward is displayed in association with required information corresponding to a future distance that the terminal apparatus will pass in the real world in the future, wherein the new reward is proportional to the cumulative distance when the cumulative distance is equal to or less than the predetermined distance, the new reward is non-proportional to the cumulative distance when the cumulative distance is more than the predetermined distance, and wherein the plurality of first signals are generated in the terminal apparatus when:
　a measurement command is input via the terminal apparatus by the user; and
　when the timer counts a completion of every first period of time.

10. A computer program product embodying computer-readable instructions stored on a non-transitory computer-readable medium for causing a computer to execute a process by a processor so as to perform the steps of:

receiving a game start signal from a terminal apparatus by a server apparatus, the game start signal including initial terminal information, the initial terminal information corresponding to an initial location of the terminal device where a game application is executed at a first time, the initial terminal information corresponding to a user ID of a user operating the terminal apparatus, the terminal apparatus having a GPS receiver and a timer, the GPS receiver being configured to identify a location of the terminal apparatus, the timer being configured to count a first period of time;

performing authentication in response to the user ID;

sending a user signal to the terminal apparatus from the server apparatus after the processor authenticates the terminal apparatus in response to the user ID, the user signal including authenticated user information and game information, the authenticated user information corresponding to a result of a user authentication in response to the user ID, the game information being required to continue the game application in the terminal apparatus;

receiving a plurality of first signals from the terminal apparatus during the execution of the game application by the server apparatus, the plurality of first signals including first terminal information of the terminal apparatus, the first terminal information corresponding to location information with respect to later locations of the terminal apparatus, the later locations corresponding to locations where the terminal apparatus is located at later times that are different from the first time in a real world;

calculating a cumulative distance by summing a plurality of the distances corresponding to a plurality of locations including the initial and later locations in response to the game start signal and the plurality of first signals;

determining whether the cumulative distance is equal to or less than a predetermined distance or is more than the predetermined distance; and sending a second signal to the terminal apparatus from the server apparatus, the second signal including reward information of a new reward that is to be granted to the terminal apparatus, the new reward being set in accordance with the cumulative distance so as to display the reward information on a display of the terminal apparatus during the execution of the game application, wherein the display of the terminal apparatus is configured to display the new reward and a possible reward that will be acquired in the future via the game application, the possible reward is displayed in association with required information corresponding to a future distance that the terminal apparatus will pass in the real world in the future, wherein the new reward is proportional to the cumulative distance when the cumulative distance is equal to or less than the predetermined distance, the new reward is non-proportional to the cumulative distance when the cumulative distance is more than the predetermined distance, and wherein the plurality of first signals are generated in the terminal apparatus when:
  a measurement command is input via the terminal apparatus by the user; and
  when the timer counts a completion of every first period of time.

* * * * *